US011219873B1

(12) United States Patent
Blichmann (10) Patent No.: US 11,219,873 B1
(45) Date of Patent: Jan. 11, 2022

(54) CARBONATION METHOD

(71) Applicant: Blichmann Engineering, LLC, Lafayette, IN (US)

(72) Inventor: John Blichmann, Lafayette, IN (US)

( * ) Notice: Subject to any disclaimer, the term of this patent is extended or adjusted under 35 U.S.C. 154(b) by 0 days.

(21) Appl. No.: 16/581,147

(22) Filed: Sep. 24, 2019

Related U.S. Application Data (63) Continuation-in-part of application No. 15/412,937, filed on Jan. 23, 2017, now Pat. No. 10,456,757.
(60) Provisional application No. 62/747,466, filed on Oct. 18, 2018, provisional application No. 62/281,766, filed on Jan. 22, 2016.

(51) Int. Cl.
*A23L 2/54* (2006.01)
*B01F 3/04* (2006.01)
*B01F 15/00* (2006.01)
*C12C 11/11* (2019.01)

(52) U.S. Cl.
CPC ............ *B01F 3/04808* (2013.01); *A23L 2/54* (2013.01); *B01F 3/04503* (2013.01); *B01F 15/00149* (2013.01); *B01F 15/00357* (2013.01); *B01F 15/00409* (2013.01); *C12C 11/11* (2013.01); *A23V 2002/00* (2013.01); *B01F 2003/049* (2013.01); *B01F 2215/0068* (2013.01)

(58) Field of Classification Search
CPC .............. A23L 2/54; B01F 15/00149; B01F 15/00357; B01F 15/00409; B01F 2003/049; B01F 2215/0068; C12C 11/11; A23V 2002/00
See application file for complete search history.

(56) References Cited

U.S. PATENT DOCUMENTS

| | | | | | |
|---|---|---|---|---|---|
| 2,081,029 | A | * | 5/1937 | Young | B01F 3/04808 95/255 |
| 2,116,939 | A | * | 5/1938 | Zahm | C12H 1/14 417/68 |
| 2,226,958 | A | * | 12/1940 | Zahm | B01F 3/04262 261/64.1 |
| 2,227,101 | A | * | 12/1940 | Meyer | A23L 2/54 426/477 |
| 2,926,087 | A | * | 2/1960 | Rickers | C12H 1/14 426/477 |
| 3,472,425 | A | * | 10/1969 | Booth | B67D 1/0057 222/129.1 |
| 3,746,323 | A | * | 7/1973 | Buffington | B01F 3/04808 261/122.1 |
| 4,562,013 | A | * | 12/1985 | Jeans | B01F 3/04808 137/516.11 |
| 4,629,589 | A | * | 12/1986 | Gupta | B01F 3/04531 222/129.1 |
| 4,745,853 | A | * | 5/1988 | Hoover | A23L 2/54 99/323.1 |

(Continued)

*Primary Examiner* — Anthony J Weier
(74) *Attorney, Agent, or Firm* — Gutwein Law; Tyler B. Droste (57) ABSTRACT

A method and apparatus for carbonating a liquid in a pressurizable vessel, including first connecting a vessel with a carbon dioxide tank, wherein said vessel contains a liquid. A vessel can then be pressurized with carbon dioxide to a desired pressure. A pump or compressor can be activated to circulate gas through a hose out of the head space of the vessel to a carbonating stone back into the vessel. After a pre-determined period of time the pump is deactivated, and the carbon dioxide can cease to be introduced to the liquid within the vessel.

9 Claims, 11 Drawing Sheets

(56) References Cited

U.S. PATENT DOCUMENTS

| | | | | |
|---|---|---|---|---|
| 4,804,112 | A * | 2/1989 | Jeans | B67D 1/0057 222/129.1 |
| 4,850,269 | A * | 7/1989 | Hancock | B01F 3/04241 99/323.1 |
| 5,217,621 | A * | 6/1993 | Norris | B01F 3/04099 210/220 |
| 5,510,060 | A * | 4/1996 | Knoll | B67D 1/0058 261/27 |
| 8,641,018 | B2 * | 2/2014 | Sonnenrein | B01F 15/00253 261/76 |
| 9,700,852 | B2 * | 7/2017 | Shalev | A47J 31/407 |
| 10,143,977 | B2 * | 12/2018 | Shalev | A47J 31/4403 |
| 10,213,752 | B2 * | 2/2019 | Shalev | A23L 2/54 |
| 10,456,757 | B1 * | 10/2019 | Blichmann | B01F 15/00175 |
| 2004/0238975 | A1 * | 12/2004 | Sakakibara | A23L 2/54 261/100 |
| 2005/0260301 | A1 * | 11/2005 | Ooyachi | B01F 3/04269 426/67 |
| 2006/0131332 | A1 * | 6/2006 | Khalaf | F04C 11/001 222/135 |
| 2011/0226343 | A1 * | 9/2011 | Novak | B01F 3/04808 137/12.5 |
| 2014/0065266 | A1 * | 3/2014 | Shalev | A47J 31/44 426/89 |
| 2015/0047967 | A1 * | 2/2015 | Burton | B01D 5/006 203/49 |
| 2015/0251143 | A1 * | 9/2015 | Shalev | A47J 31/4403 426/115 |
| 2016/0003523 | A1 * | 1/2016 | Kim | B01F 15/00155 222/146.6 |
| 2016/0106256 | A1 * | 4/2016 | Gordon | A47J 31/46 99/295 |
| 2017/0120204 | A1 * | 5/2017 | Tipton | B01F 15/00175 |

* cited by examiner

CARBONATION METHOD

CROSS-REFERENCE TO RELATED APPLICATION

This U.S. Patent application claims priority to U.S. Provisional Application 62/747,466 filed Oct. 18, 2018, and is a Continuation-In-Part application claiming priority to U.S. Non-provisional Application Ser. No. 15/412,937 filed Jan. 23, 2017, now U.S. Pat. No. 10,456,757, which claims priority to U.S. Provisional Application 62/281,766 filed Jan. 22, 2016, the disclosures of which are considered part of the disclosure of this application and is hereby incorporated by reference in its entirety.

FIELD OF THE INVENTION

This invention relates generally to an apparatus and method of carbonating aqueous solutions, including beer.

BACKGROUND

In the beer brewing industry, it is known that beer must be carbonated to achieve the desired flavor and palate texture for the end consumer. One method of achieving carbonation in beers is known as krausening, which can be achieved by adding additional fermentable sugars to a beer while in a pressure vessel. This causes a secondary fermentation, a subsequent discharge of $CO_2$, and a natural increase in carbonation to a known level. This method and the method of directly adding fermentable sugar to the beer is known as bottle or keg conditioning and can leave an undesirable amount of residual yeast sediment at the bottom of the container that may be objectionable to some consumers. In addition, krausening can also takes a week or more to achieve a desired carbonation level.

Alternatively, many breweries and beer bottlers use a force-carbonation method to carbonate their beer, which is accomplished by applying pressurized carbon dioxide ($CO_2$) to the container at a specified temperature. The volume of $CO_2$ (the standard unit used to measure carbonation level in the industry) is easily controlled via a carbonation chart of temperature of the beer and pressure of the $CO_2$. While this process will carbonate beer without additional yeast sediment, it also takes a week or more to dissolve the prescribed amount of $CO_2$ in the beer. In order to expedite this process, a carbonation or carbonating stone can be used. The stone is typically a sintered stainless-steel porous cylinder that can be placed into a serving vessel. Common stones contain pores having a diameter from about 0.5 to about 2 microns to deliver very small bubbles into the liquid.

These stones create small bubbles of $CO_2$ to be exposed to the beer. The small bubbles present a very large surface area to the beer, speeding along the dissolution into the beer. However, the stones can be restrictive to $CO_2$ flow and require high pressures from about 20 to about 30 pounds per square inch (PSI) to push $CO_2$ through the stones at an acceptable rate. Additionally, the process still takes days to complete and is a relatively manual process of venting and charging, leading to a fairly uncontrolled level of carbonation due to the high $CO_2$ pressures required wherein the beer may become over-carbonated or under-carbonated based on the skill of the operator.

Over-carbonation occurs when the equilibrium pressure at a given temperature is exceeded. In addition, the venting of the $CO_2$ gas to allow a continual flow of $CO_2$ is wasteful and expensive. Lastly, it is known to place a carbonation stone in-line with a hose running between the fermentation vessel to the dispensing vessel and injecting the $CO_2$ as it is pumped from the fermentation vessel to the receiving vessel. Despite the speed of operation, it is not readily feasible to consistently control the level of carbonation in the beer, resulting in under or over carbonated beer that can drastically affect the beer quality.

Similarly, to speed up the process, the tank is often vented so that the CO2 gas will flow continuously through the carbonation stone. While this process does allow for fast carbonation, it wastes a significant amount of CO2 and the carbonation levels are not consistent. This process also significantly removed the hop and volatile aromas of the beer making it less desirable to the consumer. Lastly, it is known to place a carbonation stone in-line with a hose running between the fermentation vessel to the dispensing vessel and injecting the CO2 as it is pumped from the fermentation vessel to the receiving vessel. Despite the speed of operation, it is not readily feasible to consistently control the level of carbonation in the beer, resulting in under or over carbonated beer that can drastically affect the beer quality.

It is a primary objective of this invention to provide a carbonation system and process that can overcome the variability in the carbonation level and reduce the time to carbonate from days or weeks to approximately an hour or less. It is also an objective of this invention to create a system and process that results in a consistently carbonated beer regardless of the operator's skill. It is also an objective of this invention to create a closed loop system and process that results in a consistently carbonated beer without low of important aromas regardless of the operator's skill.

BRIEF SUMMARY OF THE INVENTION

In one aspect, this disclosure is related to a method of carbonating a liquid in a pressurizable vessel, comprising first connecting a vessel with a carbon dioxide tank, wherein said vessel contains a liquid. A vessel can then be pressurized with carbon dioxide to a desired first pressure. A pump is activated to circulate carbon dioxide accumulating in the head space through a hose out of the vessel back into the vessel at a carbonation stone. Carbon dioxide is introduced to the liquid at a desired pressure level, wherein the second pressure is the same or greater than said first pressure. After a pre-determined period of time the pump can be deactivated, and the carbon dioxide can cease to be introduced to the liquid flowing through the system.

In another aspect, this disclosure is related to an apparatus for in-line carbonating a liquid. The apparatus comprising a pump having an inlet aperture and an outlet aperture, a fitting assembly comprising a carbonation inlet, and a carbonating stone. The apparatus further comprises a plurality of hoses, wherein said hoses fluidly connect said pump to said fitting assembly and the apparatus to any external vessels or tanks.

In another aspect, this disclosure is related to a system for carbonating a liquid comprising at least one pressurizable tank having an control valve; at least one vessel; a carbonation apparatus comprising a pump having an inlet aperture and an outlet aperture, a fitting assembly comprising carbonation inlet and a carbonating stone; and at least one hose, wherein said hose fluidly connect said pump to said fitting assembly; and a plurality of hoses interconnecting said carbonation apparatus to said vessel and said pressurizable tank.

In another aspect, this disclosure is related to a system for carbonating a liquid comprising at least one pressurizable tank having an control valve; at least one vessel; a carbonation apparatus comprising a pump having an inlet aperture and an outlet aperture, a flow bypass line, a fitting assembly comprising carbonation inlet, and a carbonating stone; and at least one hose, wherein said hose fluidly connect said pump to said fitting assembly; and a plurality of hoses interconnecting said carbonation apparatus to said vessel and said pressurizable tank.

In another aspect, this disclosure is related to a system for carbonating a liquid having at least one pressurizable tank having a control valve. At least one vessel having a top end and a bottom end, wherein a first port is positioned proximate to the top end and a second port is positioned proximate to the bottom end. A carbonation apparatus can include a pump having an inlet aperture fluidly connected to the first port and an outlet aperture fluidly connected to the second port and a carbonating stone located within or proximate to said second port of the vessel, wherein said carbonation stone is configured to expose the liquid to a compressed gas. The system can further include a plurality of hoses configured to fluidly connect said carbonation apparatus to said vessel and said pressurizable tank.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1:
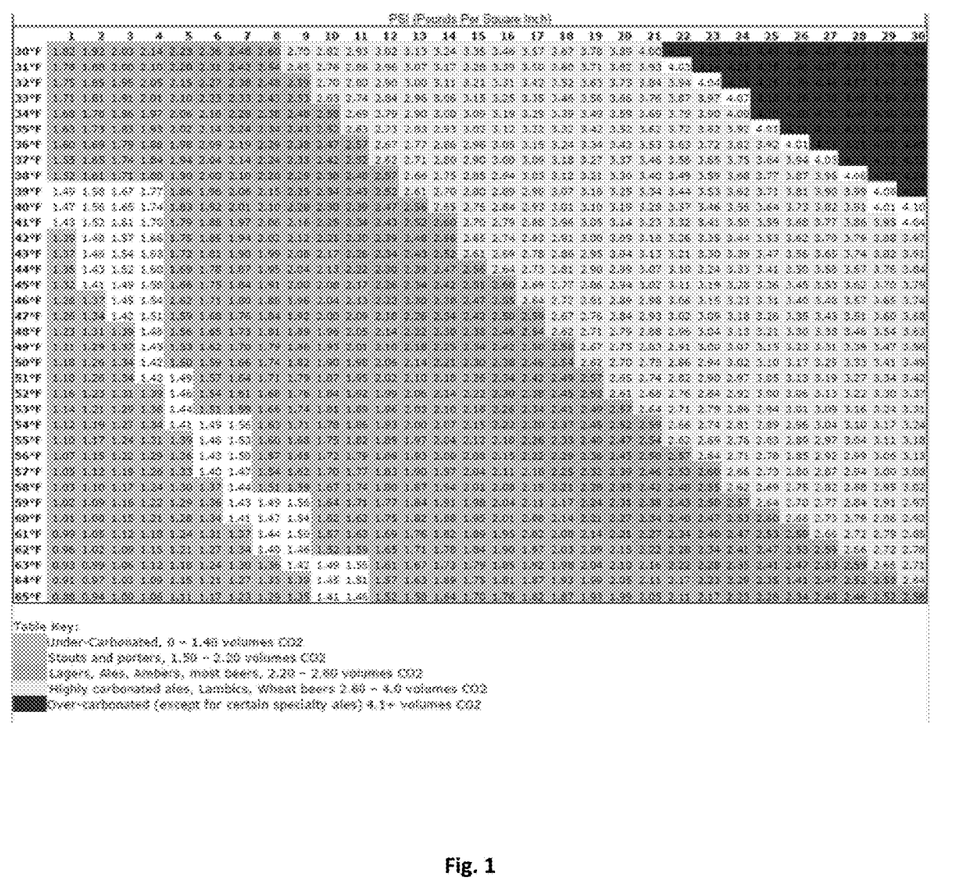
FIG. 1 is a carbonation level reference chart to determine the volume of $CO_2$ in a liquid based on the temperature and pressure.

The present invention relates to an apparatus and method for the carbonation of a liquid, such as beer. The present invention may also be used for nitrogenation of a liquid, such as beer, wine, cider, or other liquids. Referring specifically to beer, the carbonation process can take days to properly carbonate a beer to the desired saturation or solubility. The solubility of $CO_2$ can vary greatly depending on the temperature of the beer being carbonated and the pressure conditions of the beer and gas at equilibrium conditions. Equilibrium is achieved when the $CO_2$ ceases to dissolve into the beer. FIG. 1 is a carbonation level reference chart, illustrating the volume of $CO_2$ at different temperatures and pressures.

FIGS. 2-5 illustrate exemplary embodiments of a carbonating apparatus that comprise a closed, pressurized loop that is configured such that beer is recirculated from a vessel port 101 via a pump 103, through a first hose 105, to a fitting assembly 107 containing an in-line carbonation stone 109 that is connected to a compressed gas tank, such as a carbon dioxide ($CO_2$) tank 111 via a carbonation hose 113. It is understood that other types of compressed cases can be used other than $CO_2$ such as nitrogen. The beer is returned to the vessel 117 from the fitting assembly 107 via a second hose 115 to the inlet port 119 on the vessel. The pump 103 is fluidly connected to the fitting assembly 107. In some embodiments, an intermediary hose 121 can be used to fluidly connect the pump 103 and the fitting assembly 107. Any suitable means can be used to connect the hoses to each apparatus, such as quick disconnect fittings 123 shown in FIGS. 3-5. Other connectors can include hose clamps, band clamps, and other suitable clamps and hose fittings. In one exemplary embodiment the vessel 117 can be a sealable pressurizable vessel. The vessel 117 can have at least one liquid/gas port, such as the vessel port 101 and the inlet port 119 that is able to allow a user to attach a hose to carbonate a liquid, such as beer, in the vessel 117. One or both of these ports can also be coupled to a tube 137 extending in the interior of the vessel 117 from the top of the vessel interior to the about the bottom of the interior of the vessel 117. These ports can also be used to move beer in and out of the vessel 117. These connection ports can be check valves configured to stop the flow of a gas or liquid when the hose is removed. One exemplary embodiment of a vessel is a beer keg or a corny-type keg. Any suitable power source 125 can be used to power the pump, such as a battery or a plug for tapping into an electrical grid.

The carbonation system can be used to more rapidly carbonate the beer within a vessel. The vessel can first be placed under a first prescribed $CO_2$ pressure at a prescribed beer temperature to achieve an equilibrium $CO_2$ volume desired by the user. It is possible to carbonate the beer within the vessel without the initial pressurizing of the vessel as described above. A $CO_2$ tank can be connected to the keg via a second carbonation hose that is coupled to a liquid/gas port on the vessel. For example, a beer at about 40° F. would typically be carbonated to a pressure of about 12 PSI to create a desired carbonation volume of about 2.5 times the original carbonation volume, which is one preferred level for many beers.

Figure 2:
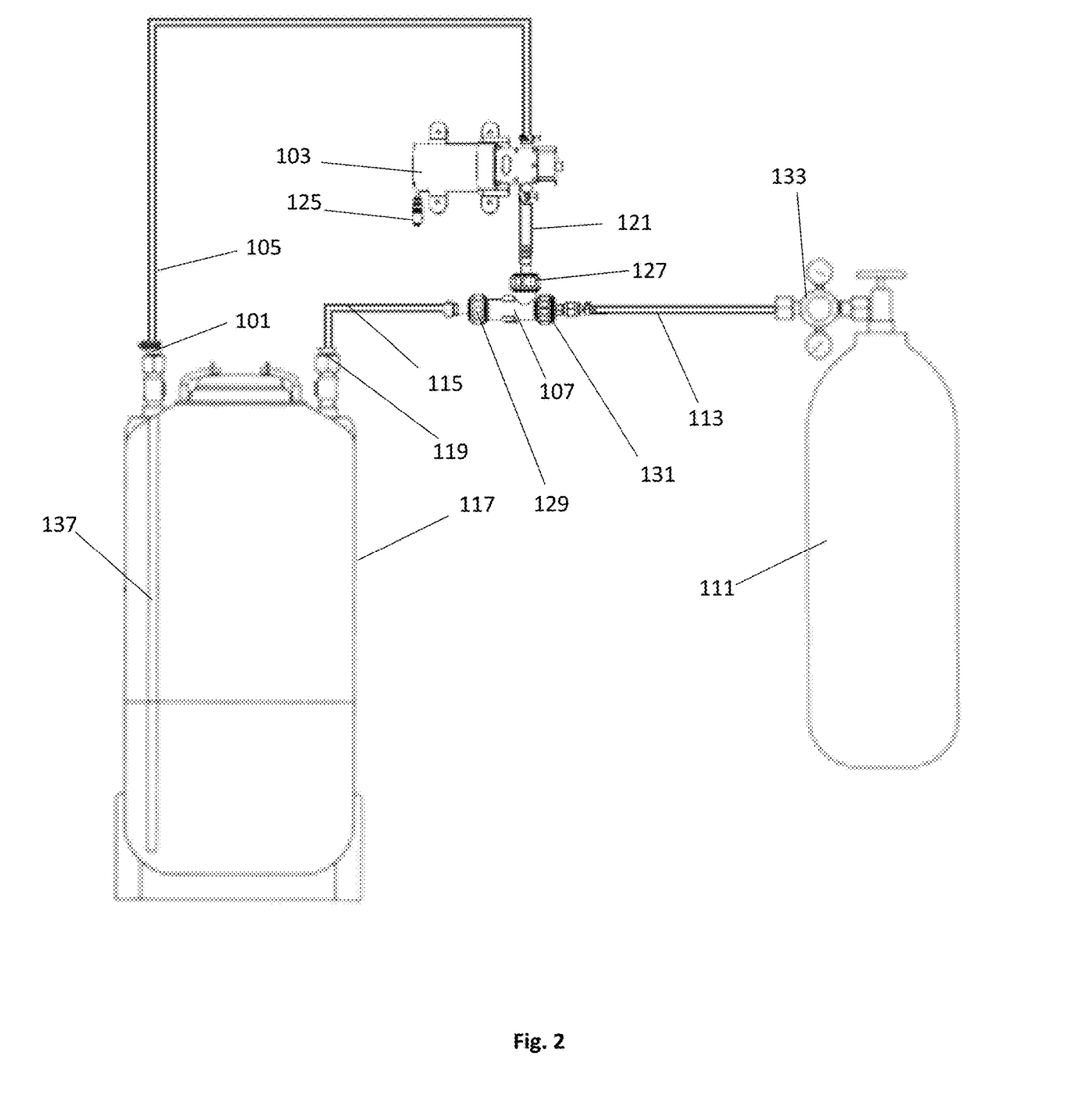
FIG. 2 is an illustration of a carbonation system using an in-line carbonator to carbonate a liquid in a vessel.
Figure 3:
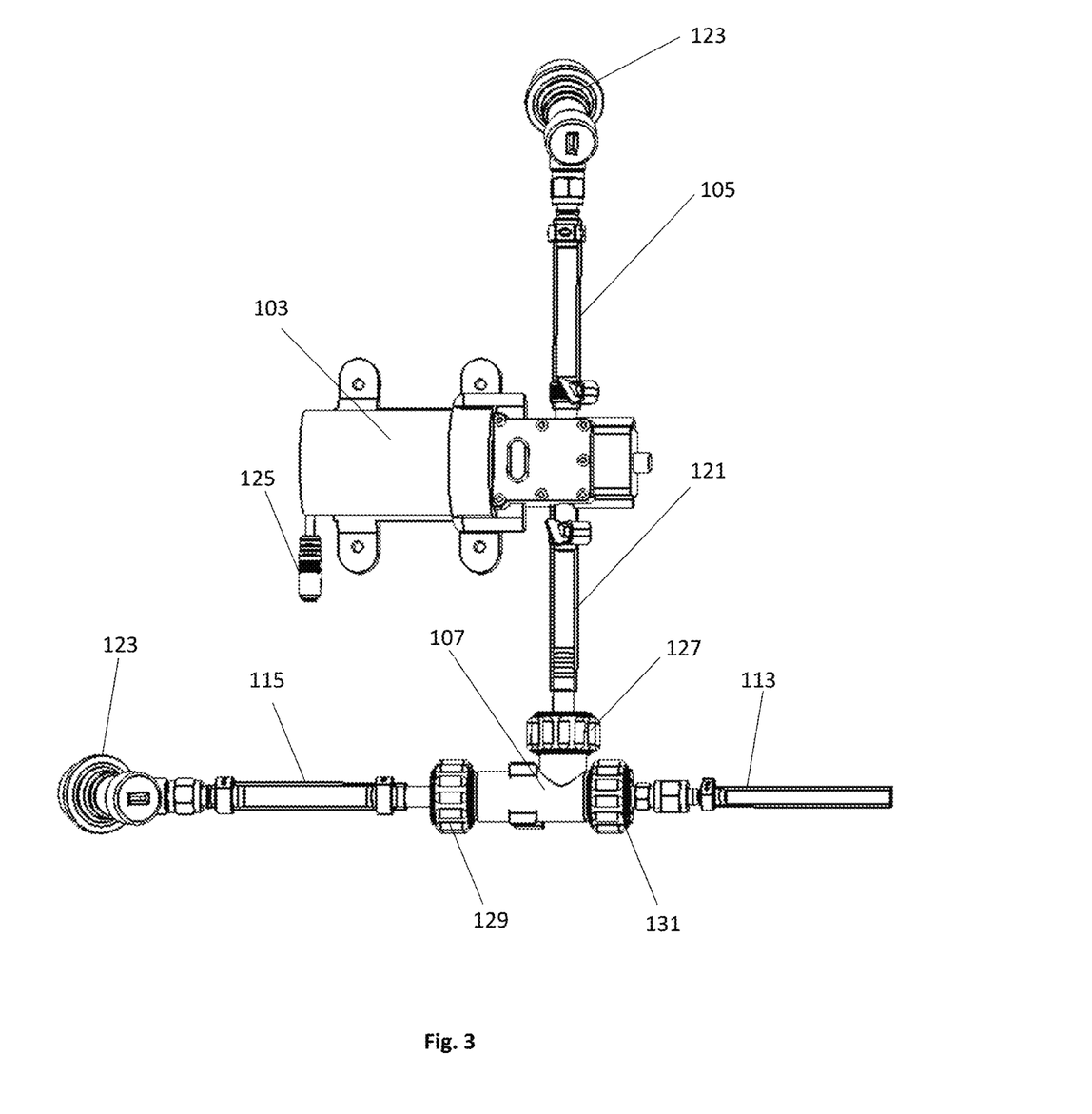
FIG. 3 is a perspective view of an exemplary embodiment of a carbonator used to carbonate a liquid.

After the vessel is pressurized to the first prescribed $CO_2$ pressure, the carbonation apparatus 100, also referred to as a "carbonator," can be attached to the vessel 117. It is also understood that the carbonation apparatus 100 can be attached to the vessel 117 before or during the initial pressurization of the vessel. The carbonator can have a pump 103 that can be used to circulate the beer from the vessel, through a fitting assembly 107, and back into the vessel 117. In some embodiments, the fitting assembly 107 can be a three-way tee or wye fitting assembly having three ports: a fluid inlet port 127, a fluid outlet port 129, and a carbonation inlet port 131. The fitting assembly 107 is fluidly connected the pump 103. In one exemplary embodiment, the fluid inlet port 127 of the fitting assembly 107 can be fluidly connected to the pump 125 via the intermediary hose 121 and a second hose 115 can fluidly connect the fluid outlet port 129 and return the fluid or beer back to the vessel 117. The fitting assembly 107 can also have a porosity or carbonating stone 109 that can be coupled to the carbonation inlet port 131 and used to help with the carbonation process. The carbonation stone 109 can be fluidly connected to a $CO_2$ tank 111 via a first carbonation hose 113. In one exemplary embodiment, the pores of the stone have a diameter between about 0.5 microns and about 30 microns, between about 5 and 25 microns, or between about 10 and 20 microns.

It is known in the industry that as beer becomes more saturated with $CO_2$, the flow of $CO_2$ through the stone slows and the pressure in the vessel can rise above the recommended saturation pressure, thereby leading to over-carbonated beer. According to the present disclosure, one exemplary embodiment uses a carbonating stone comprising pores having a larger diameter of about 10 to about 20 microns, which unexpectedly exhibits a low restriction on the beer while still providing $CO_2$ bubbles adequately small to rapidly dissolve in the beer. The unexpected result is that the carbonating stone according to this disclosure allows a second prescribed carbonation pressure to be set only about one or two PSI above the first prescribed pressure applied to the vessel, thereby virtually eliminating the possibility of over-carbonation.

In addition, the second hose carrying the beer back to the vessel can be a saturation hose having a sufficient internal volume to reduce the velocity of beer through the second hose, allowing sufficient time for the dissolution of the larger gas bubbles into the beer prior to re-entering the vessel. In one preferred embodiment, the hoses can be a clear hose to allow a use to monitor the rate of $CO_2$ bubbles entering the beer and subsequently monitor when the bubble flow rate slows indicating saturation of the beer. The apparatus and method of the present disclosure enables beer to be carbonated to desired level in less than about three hours, such as less than about two hours, and even less than about one hour with little input from the user. In general, the time to carbonate about 5 gallons of beer is about one hour. That is, if the user fails to turn off the equipment after about an hour, the beer will not significantly over-carbonate from excessive carbonation time.

Figure 4A:
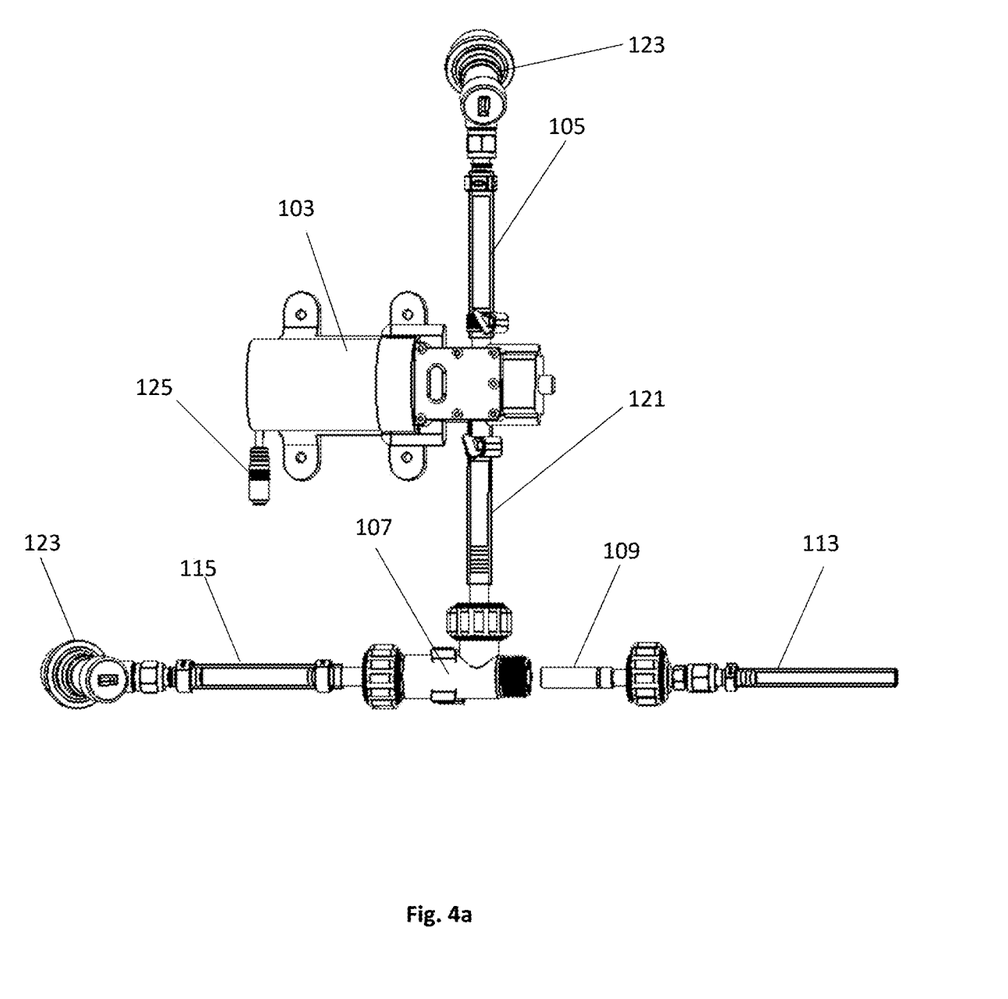
FIG. 4a is a partially exploded perspective view of exemplary embodiment of a carbonator used to carbonate a liquid, showing the carbonation stone.

As shown in FIG. 4a, a carbonation stone 109 is configured proximate to the carbonation inlet 131; optionally, in some embodiments, the carbonation stone 109 is coupled to the carbonation inlet 131. The carbonation stone 109 can be fluidly connected to a $CO_2$ tank, which can be used to aid carbonating the fluid flowing through the fitting assembly 107. The same $CO_2$ tank used to apply a first pressure to the vessel can be used to provide a second pressure to the carbonation stone and fitting assembly. This can be accomplished with a dual carbonation regulator 133 coupled to the $CO_2$ tank 111 shown in FIG. 1. Similarly, a single tank with a single regulator can be used to pressurize the tank and then can be removed, readjusted to the second $CO_2$ pressure, and then connected to the $CO_2$ inlet of the apparatus. Alternatively, two separate tanks can be used to provide the first and second prescribed carbonation pressures to the vessel and fitting assembly respectively.

As the beer enters into the fitting assembly 107 from the fluid inlet 127, $CO_2$ from a carbonation stone 109 can create $CO_2$ bubbles that can be diffused into the liquid. The liquid can then exit the fitting assembly 107 through the fluid outlet 129, at which point the beer is circulated back to the vessel 117. This process can continue until the proper volume of $CO_2$ is achieved, as best shown in FIG. 1. In one exemplary embodiment, the second hose 115 can be a saturation hose that is configured to slow the velocity of the beer and $CO_2$ through the hose. This can aid in dissolution of the $CO_2$ into the beer by providing time and contact surface area with which to dissolve the $CO_2$.

Figure 5:
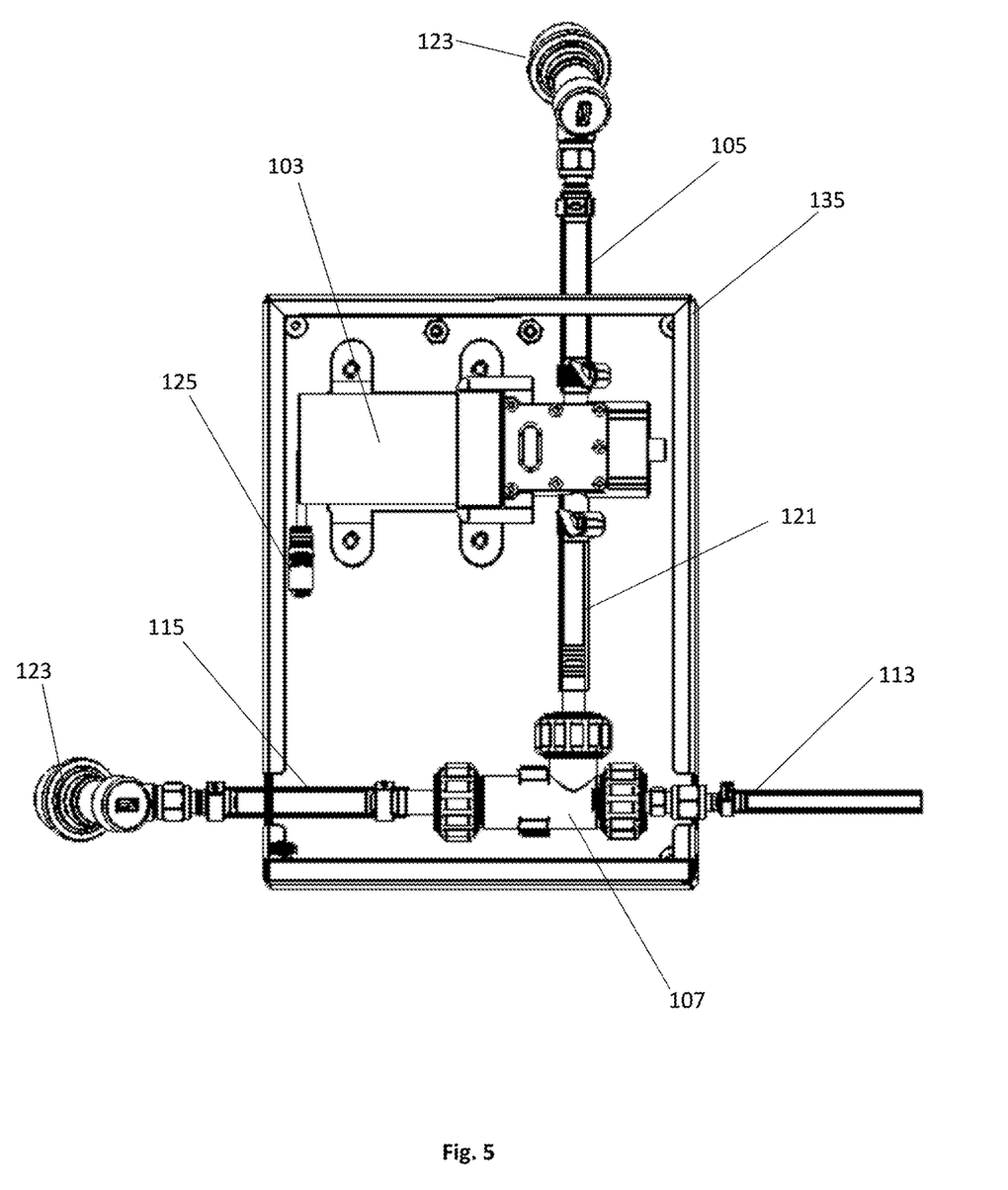
FIG. 5 is a rear view of an exemplary embodiment of a carbonator used to carbonate a liquid.

In one exemplary embodiment shown in FIG. 5, the carbonator 100 can be coupled to a housing 135. The housing can allow for easy transportation of the carbonator 100. Similarly, the housing can further comprise a handle to further the ease of moving the carbonator 100. Additionally, the carbonator housing 135 can further comprise hanging hooks to allow a user to hang the carbonator 100 on a vessel of in a location proximate to the vessel.

Sanitizing and purging the hose and pump where the beer or $CO_2$ flows may be necessary and is recommended to avoid unwanted contamination and oxidation of the beer. The $CO_2$ pressure can be regulated and set to approximately 1 PSI to about 6 psi above the desired rating, in one example, about 13 PSI. If no bubbles are seen flowing in the hose the pressure can be increased, or the pressure can be decreased if the bubbles are not substantially dissolved before returning to the vessel.

According to the disclosed apparatus, the vessel's internal pressure will quickly reduce to below the saturation pressure by about 2 PSI due to the normal system flow restrictions until such time that the beer becomes close to the saturation point. Typical internal pressure will be at least about 10 or about 11 PSI. As the beer saturates with carbonation, the pressure will build in the system to the pressure set on the $CO_2$ supply, which in one exemplary embodiment can be about 12 PSI. According to the disclosure, the flow of carbonation bubbles will gradually dissipate when the beer is saturated with $CO_2$, which occurs in one example in about an hour at the desired temperature and pressure as illustrated in the chart of FIG. 1. The pump can then be turned off and the in-line carbonator can be removed from the vessel.

In one exemplary embodiment, the carbonator can be communicatively coupled to a timer to turn off the pump and the $CO_2$ from the tank. The timer can be communicatively connected to the pump and/or a valve regulator on a $CO_2$ tank control valve, such as an on/off valve or check valve. Upon expiration of a set time, the timer can send a signal to turn off the pump and signal a valve regulator to close the valve to the $CO_2$ tank, thereby ending the carbonation process. Alternatively, the $CO_2$ pressure applied to the beer can remain connected to the tank and left on and will not over carbonate the beer. A second tank can be used to keep the vessel under pressure and can be used for dispensing the beer. A dispensing system can use a $CO_2$ tank at a predetermined pressure with the keg in a controlled temperature environment. After the beer has achieved the desired volume of $CO_2$.

Additionally or alternatively, a sensor or apparatus can be used to measure the volume of $CO_2$ in the beer that is communicatively coupled to the timer. Upon reaching a predetermined volume of $CO_2$, the sensor can signal to the timer to turn off the pump and actuate the valve regulator to turn off the $CO_2$ tank that is connected to the carbonating stone. In an embodiment comprising both a timer and a $CO_2$ sensor, the $CO_2$ sensor can override the timer's signal and, instead, signal to the valve regulator to actuate and turn the pump off either before or after the timer's original set point.

In another exemplary embodiment, the carbonation system may comprise a controller that can be communicatively coupled to a pump, a valve regulator, a thermometer, and a $CO_2$ sensor. The thermometer can be located anywhere along the system to measure the temperature of the beer. One exemplary embodiment can have a thermometer located in the vessel containing beer. Similarly, a $CO_2$ sensor can be located anywhere in the system. An ideal location for the sensor can include the vessel containing the beer or in line with the hose prior to the beer re-entering into the vessel. This can help provide an accurate reading of the volume of $CO_2$ in the beer prior to recirculating into the vessel. Additional sensors and thermometers can be used throughout the system to take additional measurement as the beer is circulating through the system. The sensors and thermometers can be communicatively connected to the controller. The controller can be used to turn off the pump and actuate the valve regulator to turn off the $CO_2$ to the carbonating stone.

Another exemplary embodiment of the present invention can include a method that first involves pressurizing a vessel containing a liquid, such as beer, with a first desired pressure of $CO_2$ to establish an equilibrium pressure. An in-line carbonator can then be coupled to the vessel via a first and second hose. The in-line carbonator can have a pump and a fitting assembly, wherein the fitting assembly can have a fluid inlet port, a fluid outlet port, and a carbonation inlet port. The pump can then be activated and begin to circulate the beer from the vessel to the carbonator's fitting assembly using any suitable hose to transport the beer between the vessel and the in-line carbonator. While the beer is flowing through the fitting assembly, the fitting assembly can be pressurized at second pressure, wherein the second pressure is greater than the first pressure of the vessel. $CO_2$ can be introduced to the beer at the fitting assembly. Once a predetermined amount of time has elapsed or until the desired volume of $CO_2$ has been reached, the pump can be deactivated, and the in-line carbonator can be disconnected from the vessel and from the carbon dioxide tank.

Figure 6:
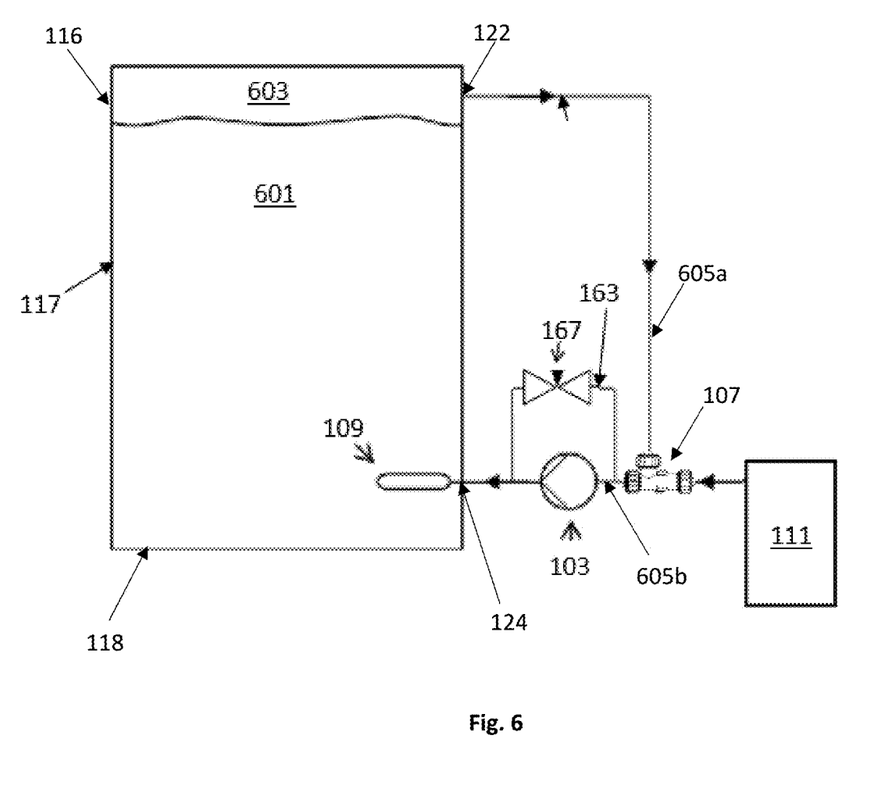
FIG. 6 is an illustration of an exemplary embodiment of the carbonation system of the present disclosure.

FIG. 6 shows a carbonation system including a tank or vessel 117 of beverage or liquid 601, such as beer, a carbonation stone 109 installed into the tank 117 in communication with the beer, a $CO_2$ supply 111 under pressure, a pump 103 for pumping and/or recirculating the $CO_2$ gas, and a return line 605 from the head space 603 to the inlet to the pump 103 through one or more hoses 605. A fitting assembly 107 can be used to couple the gas supply 111 to the system as shown in FIG. 6. One or more hoses 605 can be used to could the first port to the fitting assembly, and then the fitting assembly to the second port 124 of the vessel 117. The vessel can have a first inlet/port 122 and a second inlet/port 124. In one exemplary embodiment, the first inlet 122 can be located proximate to the top end 116 of the vessel 117 and the second inlet 124 can be located proximate to the bottom end 118 of the vessel. The first port 122 can be fluidly connected to the head space 603 of the vessel 117 and the second inlet can be fluidly connected to the hosing 605 and carbonation stone.

Figure 4B:
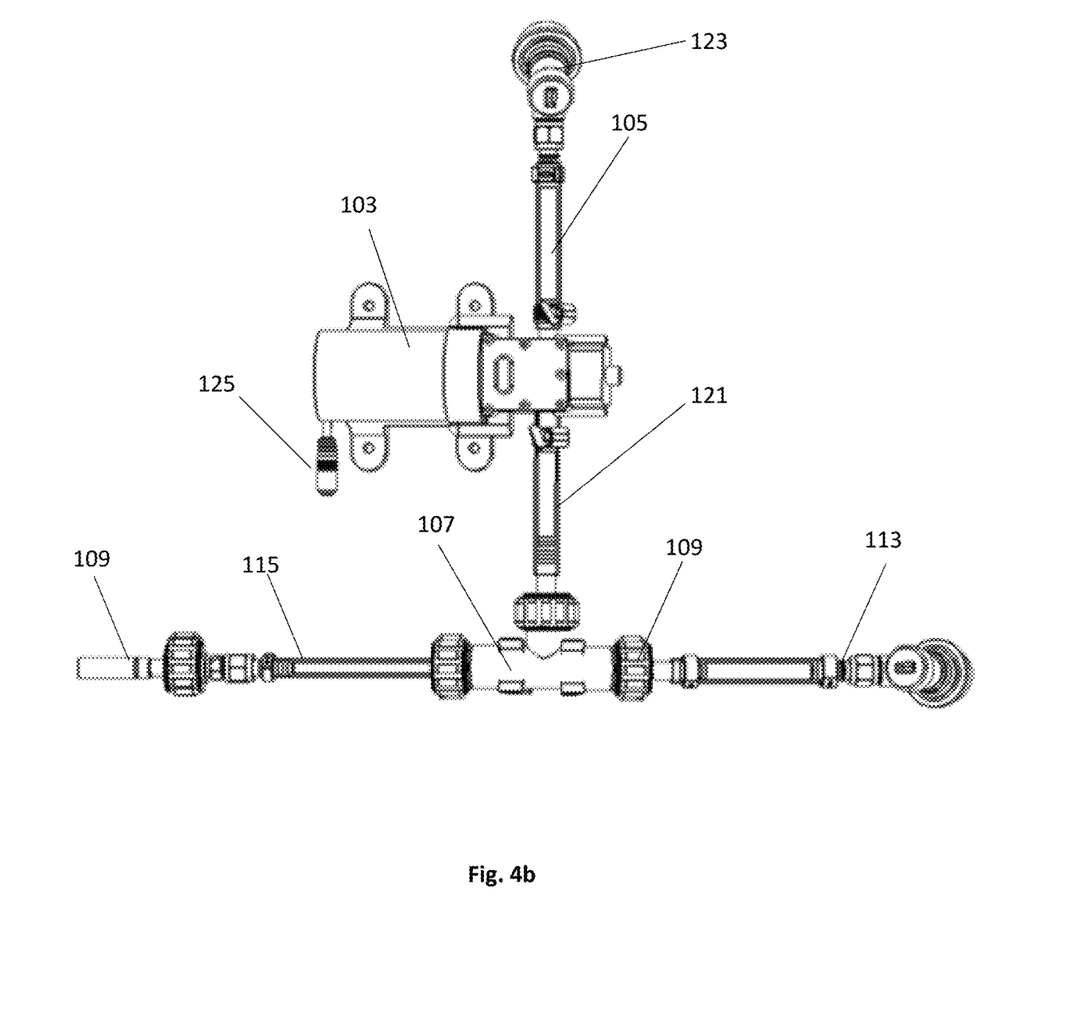
FIG. 4b is a perspective view of exemplary embodiment of a carbonator used to carbonate a liquid, showing the carbonation stone that can be located within the vessel when circulating the gas from the head space.

In some embodiments, the fitting assembly 107 can be a three-way tee or wye fitting assembly having three ports: an inlet port 127, an outlet port 129, and a carbonation inlet port 131. The fitting assembly 107 can be fluidly connected to a pump 103. In one exemplary embodiment, the inlet port 127 of the fitting assembly 107 can be fluidly connected to the first port 122 of the vessel via a hose 605a and a second hose 605b can fluidly connect the outlet port 129 and return the gas back to the vessel 117. The carbonator 100 shown in FIG. 5 can similarly be used, but instead of the fitting assembly housing a carbonation stone, the carbonation stone can be located within the vessel 117 and fluidly connected to the inlet port 124. In another exemplary embodiment, a hose can be used to couple the carbonation source to the inlet port 126, and a second hose can couple the inlet port of the pump to the port 122 of the vessel. Another hose can fluidly connect the outlet port of the pump to the port 124 of the vessel as shown in FIG. 4b.

The pump 103 can be any suitable means to circulate the gas through the system, including but not limited to a variable speed/variable flow pump, diaphragm, or positive displacement pump, and the pump 103 could be fitted with a bypass loop 163 that can optionally have a bypass valve 167 to allow the flow to the tank to be varied so as to prevent foaming or damage to the beverage from excessive flows. It can be understood that in some exemplary embodiments, the carbonation stone 109 may be optional. In embodiments including a carbonation stone, any suitable pore diameter can be used. In one exemplary embodiment, the pores of the stone can have a diameter between about 0.5 microns and about 30 microns, between about 5 and 25 microns, or between about 10 and 20 microns.

Figure 7A:
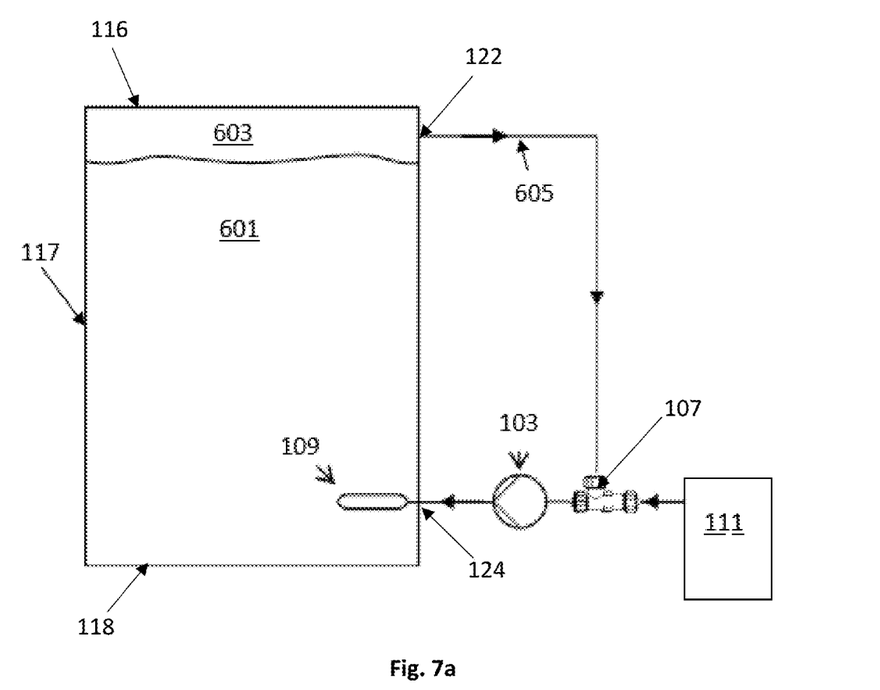
FIG. 7a is an illustration of an exemplary embodiment of the carbonation system of the present disclosure.
Figure 7B:
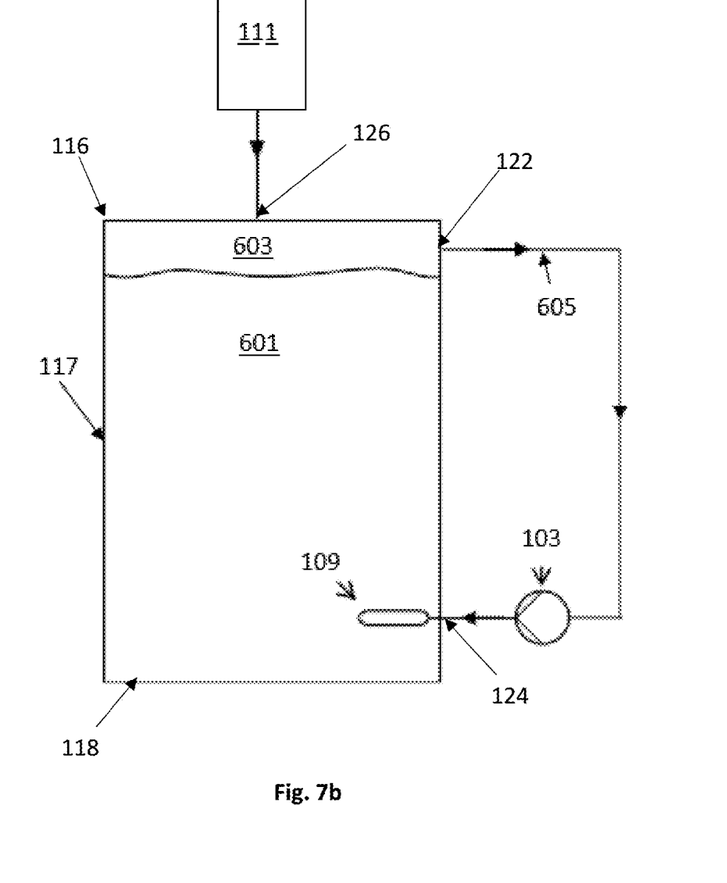
FIG. 7b is an illustration of another exemplary embodiment of the carbonation system of the present disclosure wherein the vessel has a carbonation inlet proximate to the top end of the vessel.

To carbonate the beverage the gas supply 111 can be set to a desired first pressure. The supply can be fluidly connected to the one or more hoses 605 of the system to supply the carbonation to the vessel 117. The pump 103 can then turned on and the flow of the $CO_2$ may be adjusted to a desired second pressure. In some embodiments, the first and second pressures may be the same pressure. In other embodiments, the first pressure and second pressure can be about 1 to about 3 PSI different. The desired pressure can vary depending upon a user's preference and can be set at any suitable pressure. In some embodiments, the pressure can be set between about 7 to 35 PSI, or about 10 PSI to about 14 PSI. In one exemplary embodiment, the pressure can be fixed at a desired final carbonation pressure of the liquid and vessel. The pump or compressor can then recirculate the gas at the desired pressure by moving the accumulated $CO_2$ located in the head space 603 of the vessel back through to the carbonation stone 109 located proximate to the bottom end 118 of the vessel 117 as shown in FIG. 7a-b.

Figure 8A:
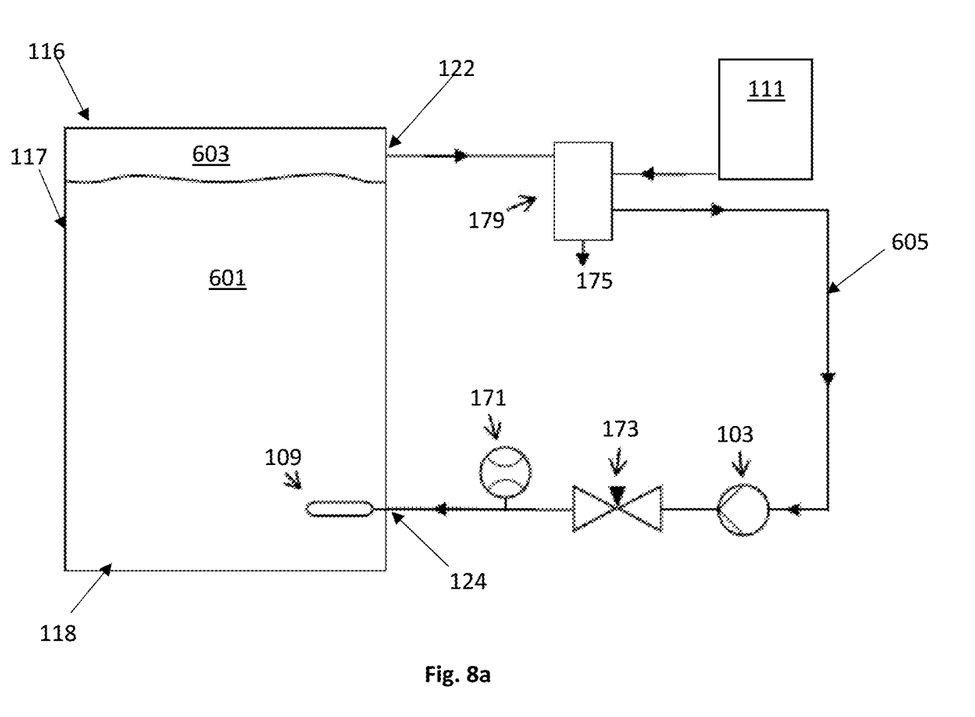
FIG. 8a is an illustration of an exemplary embodiment of the carbonation system of the present disclosure.
Figure 8B:
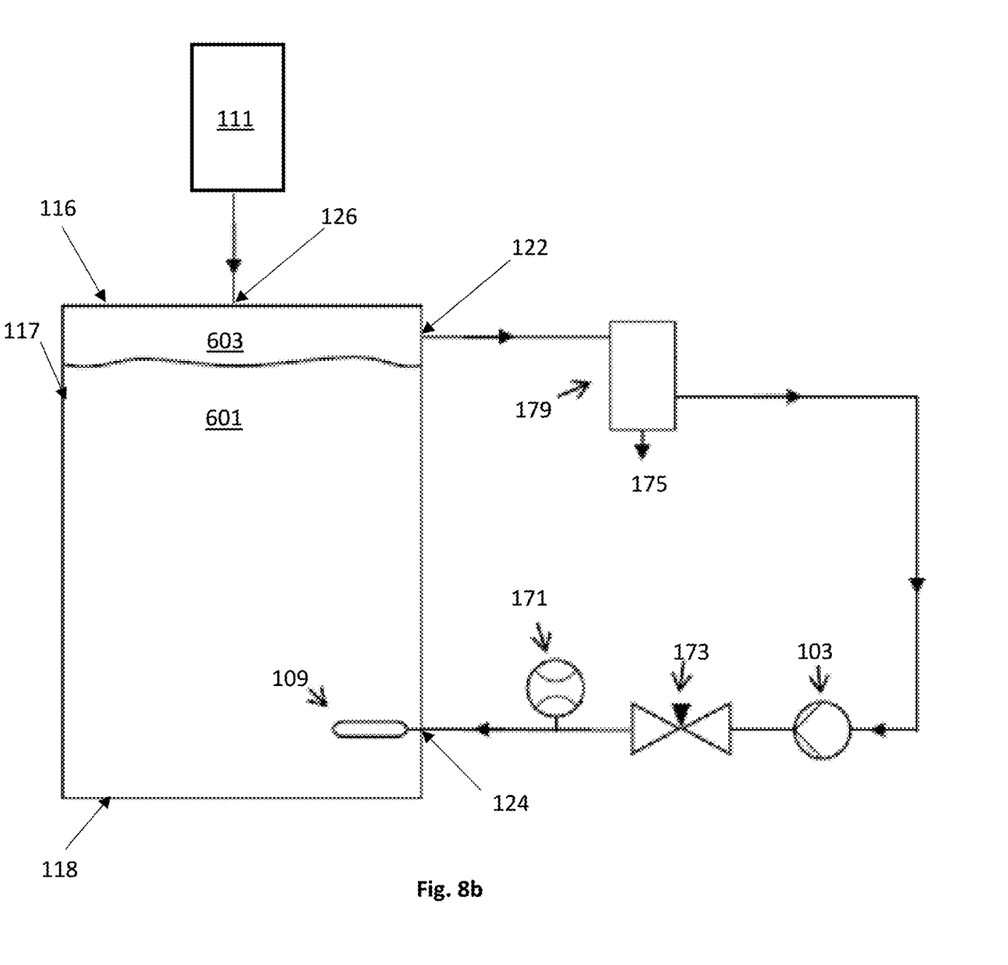
FIG. 8b is an illustration of another exemplary embodiment of the carbonation system of the present disclosure wherein the vessel has a carbonation inlet proximate to the top end of the vessel.

By setting the pressure to the single desired pressure and recirculating the gas, as opposed to the liquid, a user can establish the desired carbonation level of the liquid without having to be concerned with over carbonating the liquid. In one exemplary embodiment, the system can optionally include a flow meter 165 to adjust the flow of the $CO_2$, as shown in FIGS. 8a-b. As the $CO_2$ passes through the carbonation stone 109, most $CO_2$ will dissolve into the liquid 601. The $CO_2$ gas which does not dissolve will float to the head space 603 within the vessel 117. The compressor/pump 103 can draw the undissolved $CO_2$ from the head space 603 of the vessel 117 and recirculate it back through the carbonation stone 109. The pump can be located in any position along the recirculation hose line. In some exemplary embodiments, the pump can be located between the fitting assembly 107 and the second port 124. In other embodiments, the pump can be located between the first port 122 and the fitting assembly. Similarly, as shown in FIG. 7b, the pump can be located along the hose line between the first port 122 and the second port 124. The $CO_2$ supply 111 can maintain the desired carbonation pressure and add additional $CO_2$ into the closed system at the rate it is dissolved into the beverage. As shown in FIGS. 7b and 8b, the vessel can include a third port/inlet 126 proximate to the top end 116 of the vessel and in fluid communication with the head space

603. The third inlet port can be additionally coupled to a carbonation source 111, such as a $CO_2$ tank. The $CO_2$ tank can be coupled to the port 126 using any suitable means and via a hose if the tank is placed remotely from the vessel 117.

In some exemplary embodiments, the liquid 601 can become saturated based on the pressure and temperature of the beer commonly used in the industry in about 45 to about 75 minutes, or about 60 minutes depending upon the size of the tank, the $CO_2$ supply rate, pump flow, and other potential variables. After this point little $CO_2$ gas will be admitted by the $CO_2$ supply and the beverage will be at or close to the desired carbonation level/pressure. The $CO_2$ supply pressure can be limited to the desired carbonation pressure to prevent over-carbonation of the beverage/liquid 601 within the vessel 117. Moving $CO_2$ is more advantageous and practical with larger vessels and also can reduce the foaming of the beer in vessels with a large amount of head space. Similarly, the system is capable of applying a very precise carbonation pressure since the carbonation stone does not restrict the flow of the gas. It should be understood that the system can use other types of gas to pressurize the liquid.

In some exemplary embodiments, as shown in FIGS. 8a-b, the system can further comprise a $CO_2$ flow meter 171 to help a user better monitor and meter the $CO_2$ flow rate to minimize foaming and to carbonate the liquid in a consistent manner from vessel to vessel. Additionally, some embodiments can include a throttling valve 173 to vary the flow of recirculated $CO_2$ which can be measured by the flow meter. Optionally, some embodiments can include a foam/overflow filter or trap 179 to keep beer and beer foam out of the compressor/pump. The trap can further include a valve 175 to exhaust the foam or beer caught in the trap.

It is shown that the system can remain closed loop during the entire carbonation process to prevent $CO_2$ gas from being wasted and so no volatile aromas are lost from the liquid 601. It is also shown that a person of ordinary skill can operate the invention to prevent over-carbonation and adverse aroma effects on the beverage. It is also shown that the beverage is carbonated significantly faster than previous methods used to carbonate beer without the loss of desired aromatics.

In another exemplary embodiment, the carbonation system may comprise a controller that can be communicatively coupled to a pump, a valve regulator, a thermometer, and a $CO_2$ sensor. The thermometer can be located anywhere along the system to measure the temperature of the beer. One exemplary embodiment can have a thermometer located in the vessel containing beer. Similarly, a $CO_2$ sensor can be located anywhere in the system. An ideal location for the sensor can include the vessel containing the beer or in line with the hose prior to the beer re-entering into the vessel. This can help provide an accurate reading of the volume of $CO_2$ in the beer prior to recirculating into the vessel. Additional sensors and thermometers can be used throughout the system to take additional measurement as the beer is circulating through the system. The sensors and thermometers can be communicatively connected to the controller. The controller can be used to turn off the pump and actuate the valve regulator to turn off the $CO_2$ to the carbonating stone.

Another exemplary embodiment of the present invention can include a method that first involves supplying a desired pressure of gas, such as $CO_2$ to a vessel containing a liquid, such as beer. An in-line carbonator can then be coupled to the vessel via a first and second hose. The in-line carbonator can have a pump and a fitting assembly, wherein the fitting assembly can have an inlet port, an outlet port, and a carbonation inlet port. The pump can then be activated and begin to circulate the gas from the head space of the vessel to the carbonation stone positioned proximate to the bottom end of the vessel using any suitable hose to transport the gas between the vessel and the in-line carbonator. $CO_2$ can be introduced to the beer at the carbonation stone. Once a predetermined amount of time has elapsed or until the desired volume of $CO_2$ has been reached, the pump can be deactivated, and the in-line carbonator can be disconnected from the vessel and from the carbon dioxide tank.

It will be apparent to those skilled in the art that various modifications and variations can be made in the disclosed system and method without departing from the scope of the disclosure. Other embodiments will be apparent to those skilled in the art from consideration of the specification and practice of the various implementations disclosed herein. It is intended that the specification and examples be considered as exemplary only, with a true scope being indicated by the following claims and their equivalents.

What is claimed:

1. A method of carbonating a liquid in a pressurizable vessel having a top end and a bottom end, comprising:
   connecting the vessel to a first carbon dioxide tank and a pump, wherein said vessel contains a liquid;
   pressurizing a carbonating stone positioned proximate to the bottom of the vessel at a desired first pressure with a first carbon dioxide gas from first the carbon dioxide tank;
   introducing the first carbon dioxide gas to the liquid at the carbonation stone;
   activating the pump to circulate the first carbon dioxide gas from a head space at the top end within the vessel to the carbonation stone within the vessel;
   continually circulating the carbon dioxide gas within the head space back to the carbonation stone until the liquid reaches a desired carbonation saturation level;
   deactivating the pump and disconnecting the vessel from the first carbon dioxide tank and pump.

2. The method of claim 1, wherein the vessel is pressurized to a desired second pressure, wherein the second desired pressure can be provided utilizing at least one of the following: the first carbon dioxide gas from the first carbon dioxide tank or a second carbon dioxide gas from a second carbon dioxide tank.

3. The method of claim 2, wherein the desired first pressure and desired second pressure are the same.

4. The method of claim 3, wherein said second pressure is about 1 PSI greater than said first pressure.

5. The method of claim 2, wherein said carbonating stone comprises pores having a diameter between about 0.5 microns and about 30 microns.

6. The method of claim 3, wherein said carbonating stone comprises pores having a diameter between 10 and 20 microns.

7. The method of claim 6, wherein the pore diameter is configured to reduce the ability to over carbonate the liquid past a pre-determined carbonation level.

8. The method of claim 1, further comprising pressurizing the vessel to a desired second pressure, wherein the desired second pressure is less than the pressure applied to said carbonating stone.

9. The method of claim 1, wherein the carbon dioxide bypasses the pump and is introduced to the vessel without circulating the gas.

* * * * *